(12) United States Patent
Skjølstrup et al.

(10) Patent No.: US 11,529,604 B2
(45) Date of Patent: Dec. 20, 2022

(54) METHOD AND DEVICE FOR IMPROVING THE EFFICIENCY OF TREATING FLUIDS APPLIED TO A UV REACTOR

(71) Applicant: ULTRAAQUA A/S, Aalborg Ø (DK)

(72) Inventors: Jens Skjølstrup, Dronninglund (DK); Mathias Kraemmergaard Kristensen, Gistrup (DK)

(73) Assignee: ULTRAAQUA A/S, Aalborg Ø (DK)

( * ) Notice: Subject to any disclaimer, the term of this patent is extended or adjusted under 35 U.S.C. 154(b) by 0 days.

(21) Appl. No.: 17/049,923

(22) PCT Filed: Apr. 23, 2019

(86) PCT No.: PCT/DK2019/050124
§ 371 (c)(1),
(2) Date: Oct. 22, 2020

(87) PCT Pub. No.: WO2019/206387
PCT Pub. Date: Oct. 31, 2019

(65) Prior Publication Data
US 2021/0077976 A1 Mar. 18, 2021

(30) Foreign Application Priority Data
Apr. 23, 2018 (DK) .............................. PA2018 00178

(51) Int. Cl.
*B01J 19/12* (2006.01)
*C02F 1/32* (2006.01)

(52) U.S. Cl.
CPC ............. *B01J 19/123* (2013.01); *C02F 1/325* (2013.01); *B01J 2219/3327* (2013.01); *C02F 2201/3227* (2013.01); *C02F 2303/04* (2013.01)

(58) Field of Classification Search
CPC ........ C02F 1/325; B01J 19/123; B01J 19/006; B01J 2219/00763; B01J 2219/00765;
(Continued)

(56) References Cited

U.S. PATENT DOCUMENTS 5,200,156 A 4/1993 Wedekamp
6,657,205 B1 12/2003 Wong
(Continued)

FOREIGN PATENT DOCUMENTS

CN 201545720 U 8/2010
CN 103168004 A 6/2013
(Continued)

OTHER PUBLICATIONS

Machine Translation of CN 201545720 (Year: 2010).*
(Continued)

*Primary Examiner* — Lessanework Seifu
(74) *Attorney, Agent, or Firm* — Bookoff McAndrews, PLLC

(57) ABSTRACT

A method and UV reactor, the UV reactor having a longitudinal flow chamber, an input, and an output for fluid flow entry and exit, where the input has an inlet pipe followed by an inlet cone, said UV reactor having at least one longitudinal UV-lamp, and where the UV-lamp has a flow path from the input to the output via the flow chamber, for UV radiation exposure as fluid flows from the input to the output to receive a UV dose, so that the fluid applied to the UV reactor via the input of the flow chamber, is applied a uniform helical flow path where all the fluid applied to the UV reactor passes at least one UV lamp at a distance to receive a prescribed UV dose related to the current UV reactor, during passing of the fluid inside the UV reactor.

13 Claims, 10 Drawing Sheets

Figure 1:
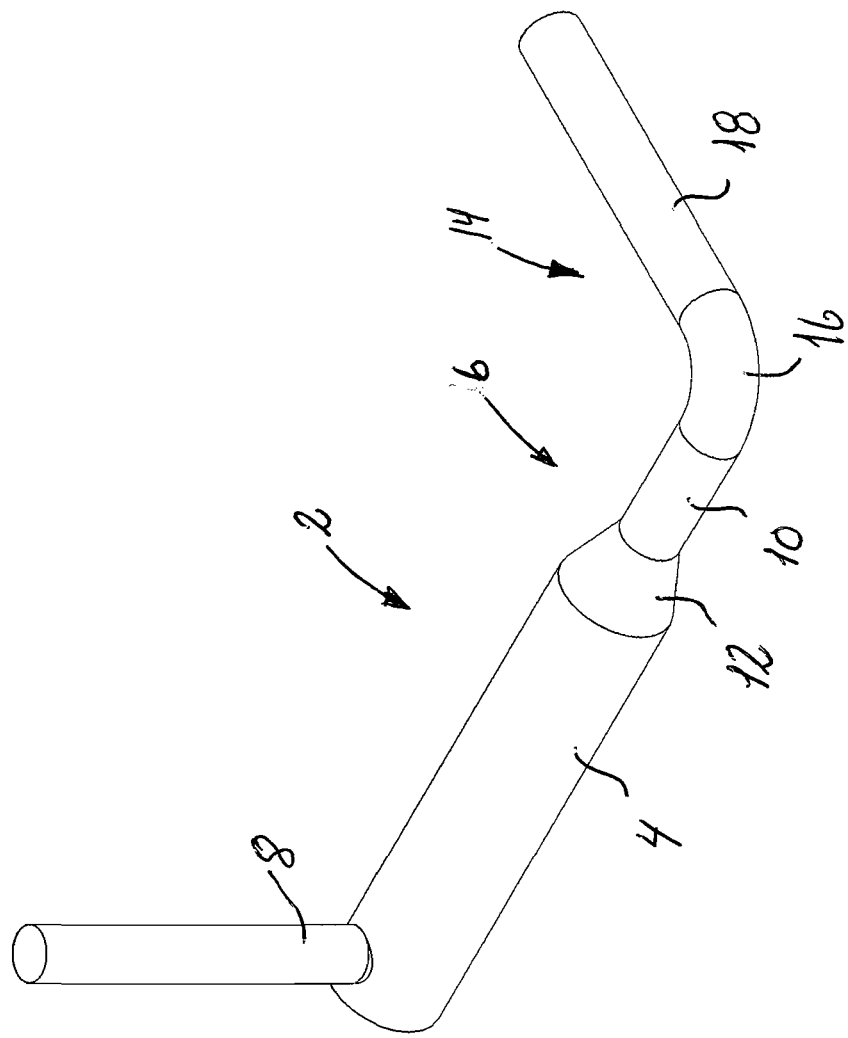

(58) Field of Classification Search
CPC ...... B01J 2219/0077; B01J 2219/00772; B01J 2219/00774
See application file for complete search history.

(56) References Cited

U.S. PATENT DOCUMENTS

| | | |
|---|---|---|
| 7,018,544 B2 | 3/2006 | Veenstra et al. |
| 8,541,758 B1 | 9/2013 | Filson, II et al. |
| 2004/0046127 A1 | 3/2004 | Wong |
| 2013/0320233 A1 | 12/2013 | Anton et al. |
| 2015/0284265 A1 | 10/2015 | Borkar et al. |
| 2016/0332127 A1 | 11/2016 | Smith |
| 2017/0305761 A1 | 10/2017 | Kezele et al. |

FOREIGN PATENT DOCUMENTS

| | | |
|---|---|---|
| DE | 102013103517 A1 | 10/2014 |
| DE | 102016211919 A1 | 1/2018 |
| EP | 2325081 A2 | 5/2011 |
| GB | 2548379 A | 9/2017 |
| WO | 2013106914 A1 | 7/2013 |

OTHER PUBLICATIONS

International Search Report in corresponding Application No. PCT/DK2019/050124 dated Jul. 16, 2019 (2 pages).

Written Opinion of the International Preliminary Examining Authority in corresponding Application No. PCT/DK2019/050124 dated Jan. 24, 2020 (4 pages).

Written Opinion in corresponding Application No. PCT/DK2019/050124 dated Jul. 16, 2019 (11 pages).

European Search Report issued in EP19791909.5 dated Dec. 15, 2021 (7 pages).

Office Action issued in Chinese Application No. 201980041926.6 dated Jun. 2, 2022 (6 pages).

* cited by examiner

METHOD AND DEVICE FOR IMPROVING THE EFFICIENCY OF TREATING FLUIDS APPLIED TO A UV REACTOR

CROSS-REFERENCE TO RELATED APPLICATION(S)

This application is the U.S. national phase entry under 35 U.S.C. § 371 of International Application No. PCT/DK2019/050124, filed on Apr. 23, 2019, which claims priority to DK Patent Application No. PA201800178, filed on Apr. 23, 2018.

The present invention relates to method for improving the efficiency of treating fluids applied to a UV reactor comprising a longitudinal flow chamber having a longitudinal center axis, an input for entry of fluid in the flow chamber, and an output for fluid to exit the flow chamber, where at least the input of the flow chamber comprises an inlet pipe followed by an inlet cone which as a part of the flow chamber increases the cross section of the channel from the inlet pipe to a cross section of the longitudinal flow chamber of the UV reactor, said UV reactor having at least one longitudinal UV-lamp parallel to but not coinciding with the longitudinal center axis, and where the UV-lamp is arranged such that fluid can flow along a flow path from the input to the output via the flow chamber, and so that fluid flowing along the flow path can be exposed to UV radiation as it flows from the input to the output to receive a UV dose.

The present invention further comprises a UV reactor for treating fluids for use in practicing the method according to the invention.

UV irradiation of flowing fluids is undertaken for various purposes. But firstly, it is important to understand that a fluid may take different characters, so as a gas, a vapor or a liquid, the last e.g. to disinfect drinking water and wastewater, and to trigger chemical reactions in a fluid which are enabled by the UV radiation.

The UV dosage given to each volume element is always decisive for the desired effect of the UV radiation in the liquid, in disinfection applications, the microorganisms contained in the water are reliably disinfected only if a specific minimum dosage is applied to them. It is therefore necessary to set the radiation power in the system in such a way that the liquid volume with the lowest accumulated intensity reliably receives a Required Minimum Dosage of UV radiation, applying the lowest Specific Power Consumption, in the following pronounced SPC, to the UV reactor.

This means that, with a strongly inhomogeneous flow within the UV reactor, some slowly flowing volume elements receive too high dosage, i.e. too much energy is expended in this area if the fastest-flowing volume elements are reliably receiving a dosage above the required minimum dosage. A substantial part of the operating costs of a system of this type for disinfecting drinking water is incurred by the power consumption of the UV radiators which are used. Efforts are made to design the flow through a UV reactor of this We to be as even as possible, so that all volume elements receive roughly the same radiation dosage.

Various solutions are proposed for this purpose. Systems exist which comprise elongated UV radiators of the mercury low-pressure radiator type, which are disposed parallel to the flow in the UV reactor. In these systems, the radiation is swirled, for example, by means of baffle plates, in such a way that all liquid volumes come into the vicinity of the radiators, thereby achieving a substantially even irradiation of the entire flowing liquid. These baffle plates increase the flow resistance of the system by inducing turbulence, and further the presence of the baffles will absorb UV light and retain substances and particles occurring in the fluid applied. Particles could possibly be adhered in 'blind current areas' as sediment, which will reduce the efficiency of the UV reactor, as well as the effect of chemical and physical cleaning systems. Further the use of such UV reactor lead to a not well defined flow profile of the fluid passing the UV reactor, and the presence of turbulence generated by the baffle plates will lead to a larger spread of doses received by each volume element of fluid passing through the UV reactor. A device of this type is presented, for example, in the publication GB 2548379 A.

CN 201545720 U (BEIJING JIARUI ENVIRONMENTAL PROT CO LTD et al.) discloses a longitudinal device for sterilizing ballast water with UV radiation. The device has a water inlet tapered pipe (2), comprising a first end provided with an opening (1) and a second end (also provided with an opening), wherein the latter is connected with the shell (9) of the device through a flange (3). The Pipe (2) is constructed such that it increases the cross section of the channel (running through the pipe (2)) from the opening (1) to the cross section of the shell (9) of the device. The inner portion of the device shell (9) is provided with a supporting disc (4) whose centre is connected with a supporting disc central shaft (5) and a device central shaft (6). Several longitudinal UV lamp tubes (7) are installed between the central shaft (6) and the device shell (9). The device shell (9) is also provided with a water outlet (10). The device is compact and when it is used ballast water fed from the inlet to the outlet is exposed to UV radiation in a stable and very efficient way. Nowhere in this script is specified that the fluid passing the inlet is applied a uniform helical flow path of the applied fluid.

U.S. Pat. No. 6,657,205B1 (WONG TOMMY CHI-KIN) 2003 Dec. 2 discloses turbine boosted UV radiation sterilizing fluid processor, comprising a quartz sleeve installed inside a tube unit, inside the quartz sleeve being installed an ultraviolet radiation lamp, at the upper and lower end of the tube unit being respectively a fluid inlet tube and a fluid outlet tube. The invention is characterized in that at the top of the tube unit and the lower part of the fluid inlet tube is installed a diversion mechanism to form a fluid pressurizing chamber. When the fluid flows through the fluid inlet tube, into the diversion mechanism, for pressurizing, a whirlpool spinning at a high speed is created so that the fluid with sterilizing function is blended properly. The fluid spinning at high speed also flushes the wall of the quartz sleeve thus increases the sterilizing effects and reduces the frequency for maintenance. The disclosed turbine boosted UV radiation sterilizing fluid processor serves to provide a turbulent flow pattern in form of a whirlpool spinning flow at high speed, created by increasing the pressure letting the applied fluid pass the diversion mechanism, which comprises a plurality of spiral blades where the inlet holes that are larger than the outlet holes, whereby is created a pressurizing chamber, wherein the velocity of the fluid is increased considerably, which leads to a high energy consumption when using the sterilizing fluid processor. The energy question is not mentioned at all, only that the spinning fluid should ensure a better blending of the applied fluid at high speed, and also reduce the frequency for maintenance.

In both cited documents nothing is mentioned about minimizing the spread of the dose Dose Distribution (DD) (The statistical distribution of the radiation dose in particles having passed the UV reactor) which will result in a more efficient UV reactor, and also in reducing the Specific Power consumption (SPC) of the UV reactors.

Even if the learning from CN 201545720 U was combined with the teachings from U.S. Pat. No. 6,657,205B1, the high energy consumption would still be a problem.

An UV reactor consists typically of a reactor chamber of an oblong vessel, comprising an inlet and an outlet. Normally there is an approximately 90 degrees bend in the piping before the inlet to the reactor, and a 90 degree bend/outlet from the reactor, and where the cross section of the vessel typically is larger than the cross section of the inlet and the outlet. Thus, a cone is located at the inlet where the diameter of the flow path is increased and accordingly the velocity of the flow of the fluid applied to the UV reactor is decreased. The reactor chamber comprises at least one UV-light source, for the radiation of the fluid applied to the reactor with UV light, which by a certain wavelength has a killing effect to bacteria and microorganisms. The fluid is applied to the UV reactor at the inlet and passes the UV reactor where the fluid is radiated until it is lead from the reactor via the outlet.

There is following fundamentals:

Fluid: Fluid, as it is meant in this patent application, may take different characters, so as a gas, a vapor or a liquid. Thus when the word 'fluid' is mentioned in the following, it should be understood in its broadest definition, and when particles are mentioned, it may be the molecules of the liquid treated in an UV reactor. Also the fluid may contain particles.

Average Dose (AD): is a theoretical radiation dose in $W/m^2$, the average intensity/flux, in the chamber, multiplied with the average residence time in seconds.

Reduction Equivalent Fluence (REF): Which is the 'practical' dose defined as the dose corresponding to the average response of all organisms passing the UV reactor receiving a variation of dosages, typically measured by comparing the reduction level of a single type of organism having passed the chamber to reduction level of the same type of organism having received a precisely defined uniform dose in a laboratory.

Hydraulic Factor (HF): Which is the ration between the average and the practical dose, where the practical REF always will be lower.

Dose Distribution (DD): The statistical distribution of the radiation dose in particles having passed the UV reactor. It is the spread in dose which is preferred to be minimized, as a lower spread leads to a minor difference between AD and REF.

Specific Power Consumption (SPC): The SPC is the necessary electrical power consumption to disinfect 1 $m^3$ of water in a certain UV Transmission factor by a determined reduction equivalent fluence.

UV Transmission factor (UVT): A specific property of water related to optical purity defined as the percentage of UV that will be able to travel a defined distance without getting absorbed. Typically measured in percent per 10 mm or percent per 100 mm.

The object of the invention is to minimize the spread of the dose (DD) which will result in a more efficient UV reactor, and reduce the SPC.

Another object of the invention is to enable that one and same UV reactor type is capable of treating fluids with a larger variation of UVT, quality and amount of bacteria or other stuffs in the fluid applied to the UV reactor e.g. same reactor, same diameter/volume of the UV reactor. This can be achieved by optimizing the Hydraulic Factor (HF).

It is by the invention realized, that this object can be achieved with a method, wherein a UV reactor comprising a longitudinal flow chamber having a longitudinal center axis, an input for entry of fluid in the flow chamber; and an output for fluid to exit the flow chamber, where at least the input of the flow chamber comprises an inlet pipe followed by an inlet cone which as a part of the flow chamber increases the cross section of the channel from the inlet pipe to a cross section of the longitudinal flow chamber of the UV reactor, said UV reactor having at least one longitudinal UV-lamp parallel to but not coinciding with the longitudinal center axis, and where the UV-lamp is arranged such that fluid can flow along a flow path from the input to the output via the flow chamber, and so that fluid flowing along the flow path can be exposed to UV-radiation as it flows from the input to the output to receive a UV dose, which is characterized in, that the fluid applied to the UV reactor via the input of the flow chamber is applied a uniform helical flow path when passing the inlet cone in combination with a flow guide located inside the inlet cone, in an extent that all the fluid applied to the UV reactor, within the operation range of the current UV reactor, at least passes at least one UV lamp at a distance to receive at least a prescribed UV radiation dose related to the current UV reactor, during passing of the fluid inside the UV reactor.

Hereby the fluid applied to the UV reactor is applied the most uniform helical flow pattern achievable when the fluid passes the UV reactor, which ensures that approximately all the applied fluid to the UV reactor will pass at least one UV source at an adequate distance to receive a certain radiation dose. The helical flow pattern achievable by the reactor according to the invention, and thereby the achievable dose distribution, is significantly more uniform than that the ones known from CN 201545720 U (BEIJING JIARUI ENVIRONMENTAL PROT CO LTD et al.) and U.S. Pat. No. 6,657,205B1 (WONG TOMMY CHI-KIN), and is achieved at a lower pressure in the UV reactor, and thus with a lower energy consumption, which leads to at better Specific Power Consumption (SPC) provided by the method according to the invention.

Further the method according to the invention will result in that the fluid lead into the UV reactor at relative low flows through the UV reactor will adapt the helical flow pattern through the flow chamber of the UV reactor, which will improve the SPC of the UV reactor relative to the known UV reactors, thus increasing the flow interval in which the UV reactor is useable with a satisfying radiation of the fluid. Further will a UV reactor built according to the method according to the invention be able to perform an efficient treatment of fluids containing a higher level of bacteria/microorganisms than the known UV reactors with similar power consumption.

The method according to the invention also includes, that the dose distribution of the fluid applied to the UV reactor, having passed the UV reactor is characterized in, that the fluid has received at least 50%, typically 65% and preferred 75% of the Average Equivalent UV dose (REF).

The choice of phrasing the characterizing part of claim 1 and 2 has been thoroughly considered before filing the application as it in practice is very difficult to express the method otherwise than mentioning some technical features, without limiting the scope of the claims, because there are many co-influencing factors to take in consideration in achieving a prescribed Reduction UV radiation dose in a UV-reactor. Some of the factors are the magnitude of the applied fluid applied to the UV reactor, pressure, the substance of the fluid e.g. viscosity, temperature, size of the section of the flow chamber of the UV reactor, the size and configuration of the piping leading the fluid to the UV reactor, the necessary flux of the radiation from the UV sources, the hydraulic conditions in the inlet cone, and more parameters.

A person skilled in the art will, using the method according to claim 1 and 2, be able to adapt and combine the above factors to achieve a prescribed Reduction UV radiation dose to a fluid, related to a current UV-reactor, during passing of the fluid inside the UV reactor. Putting intervals and figures in the claims would limit the scope of the claims in an unreasonable manner.

A UV reactor for treating fluids, for use in practicing the method according to the invention, comprising a longitudinal flow chamber having a longitudinal axis, an input for entry of fluid in the flow chamber, and an output for fluid to exit the flow chamber, where at least the input of the flow chamber comprises an inlet pipe followed by an inlet cone which as a part of the flow chamber increases the cross section of the channel from the inlet pipe to a cross section of the flow chamber of the UV reactor, said flow chamber having at least one longitudinal UV-lamp parallel to but not coinciding with the longitudinal center axis, and where the UV-lamp is arranged such that fluid can flow along a flow path from the input to the output via the flow chamber, and so that fluid flowing along the flow path can be exposed to UV-radiation as it flows from the input to the output, is characterized in, that the inlet cone has a flow guide comprising a number of radial protruding equally curved, turbine blade shaped, guide plates on the reverse side relative to the inlet pipe, said curving turbine blade shaped guide plates being equally distributed over the circular surface of the cone, said guide plates extending between the inlet of the cone and the cone end.

Hereby is achieved, that the helical flow path of the fluid applied to the UV reactor is applied to the fluid before it enters the flow chamber, as the helical flow pattern is applied the fluid when it passes the cone in the inlet. Thus there will be no baffles, guides etc. inside the flow chamber to which bacteria and microorganisms might adhere to, and also there will be no blind flow paths in the UV radiation chamber of the UV reactor introducing unintended turbulence or collecting sludge and particles occurring in the applied fluid to the UV reactor according to the invention.

The curving turbine blade shaped guide plates in the UV reactor according to the invention may in some embodiments be attached to the inner wall of the cone.

This may be appropriate in designs for smaller UV reactors according to the invention, but this design might also be usable for designing larger UV reactors.

In another embodiment of the UV reactor according to the invention, suited for separation from the cone, the inlet cone has a flow guide comprising a first plate shaped ring with a number of radial protruding equally curved, turbine blade shaped, guide plates on the reverse side relative to the inlet pipe, where a plurality of said curving turbine blade shaped guide plates being equally distributed over the circular surface of the first ring and the cone, said guide plates extending between the first plate shaped rind at the inlet of the cone and the cone end.

This embodiment is suited for UV reactors with larger capacity, and it is preferred that the flow guide is releasable fixed in position in the cone.

To enable static stability of the flow guide, in the UV reactor according to the invention, it is preferred that the flow guide at the end of the inlet cone closest to the reactor chamber comprises a second support ring supporting the radial protruding equally curved, turbine blade shaped, guide plates.

This will result in that the radial protruding equally curved, turbine blade shaped, guide plates will be supported at each end, which will improve the stability of the flow guide located in the cone.

In a further embodiment where not all the radial protruding equally curved, turbine blade shaped, guide plates are supported attached to the first plate shaped ring, it is preferred that the flow guide further comprises a third support ring located between the first plate shaped ring and the second support ring closest to the reactor chamber, supporting the radial protruding equally curved, turbine blade shaped, guide plates.

This enables for optimizing the uniform helical flow path created by the flow guide in the inlet cone of an UV reactor according to the invention.

To reduce movement of fluid in directions perpendicular to the axis of the inlet to achieve a flow generally more parallel to the axis providing a more symmetrical flow pattern across the turbine and thus a more uniform helical flow inside the flow chamber of the UV reactor, the inlet pipe may comprise a flow rectifier consisting of at least one plate shaped body located in the inlet tube. The plate shaped body will break some movement of fluid in directions perpendicular to the axis of the inlet, and prepare the fluid for being lead through the flow guide located in the inlet cone of the UV reactor.

In a further embodiment of the UV reactor according to the invention, with the intent to achieve an efficient and improved break of movement of fluid in directions perpendicular to the axis of the inlet before entering the inlet cone with the flow guide, the flow rectifier may comprise a first tube located in the center axis of the inner periphery of the inlet tube, and from the outer periphery of which first tube, one or more plate shaped bodies extends to the inner wall of the inlet tube, said plate shaped bodies being equally mutually angled around the tube, and being attached to the inner wall of the inlet tube.

The presence of a plurality of plate shaped bodies extending between the periphery of the first tube and the inner wall of the inlet tube will break the turbulent flow path in the fluid to be applied to the UV reactor via the inlet cone with the flow guide, and thus lead to a more uniform flow path inside the reactor chamber in the UV reactor.

To enable separation of the flow guide from the UV reactor according to the invention, it is preferred that the first plate shaped ring is releasable attached to the flow rectifier.

A precise location of the flow rectifier relative to the flow guide in the UV reactor according to the invention is important, as to achieve the helical uniform flow path through the reaction chamber, therefore it is preferred that at least one of the plate shaped bodies of the flow rectifier comprises a protrusion at the against the first plate shaped ring adjacent side, extending in direction of the first plate shaped ring, said protrusion cooperating with a track in the first plate shaped ring, for positioning of the flow guide relative to the flow rectifier.

Hereby is achieved that the relative position between the flow rectifier in the inlet pipe and the flow guide in the inlet cone always will be correct. This may be of great importance, as the space conditions when re-mounting a flow guide frequently are narrow. The presence of the protrusion on one of the plate shaped bodies of the flow rectifier and the cooperating with the track in the first plate shaped ring will ease the correct positioning of the flow guide relative to the flow rectifier.

In a further embodiment of the UV reactor according to the invention it is preferred that the first plate shaped ring of the flow guide flow guide via some of the curved turbine blade shaped guide plates are connected to a treaded bush cooperating with a treaded bolt lead through the first pipe, said bolt having a head which is in abutment with the reverse end of the said first pipe.

Hereby there is enabled a way to clamp the flow guide in the cone to the flow rectifier in the inlet pipe, and thus this enables for separation of the flow guide from the UV reactor, in terms of service, or exchanging of the flow guide to another type, e.g. with another shape of the blades.

In another embodiment of the UV reactor according to the invention, the flow rectifier may consist of one or more plate shaped bodies oriented transverse to the longitudinal axis of the UV reactor and the inlet pipe, said plates having one or more take outs for passing fluid into the UV reactor.

This embodiment may be usable in special conditions, where the fluid requires a special rectification, before it enters the flow guide in the inlet cone.

It is further preferred that the UV reactor according to the invention comprises a plurality of UV-lamps.

This ensures a more uniform radiation of the fluid applied to the UV reactor chamber subsequent to passing the inlet comprising the flow guide in the inlet cone, and possibly the flow rectifier in the inlet tube.

With the intent to ensure that most of the fluid applied to the reactor is radiated to a prescribed level, it is further preferred that the UV-lamps are arranged at different distances from the longitudinal center axis of the flow chamber of UV reactor according to the invention.

Live tests using bacterial spores (*Bacillus subtilis*) as biodosemeter has shown single UV chambers utilizing the invention to exhibit higher energy efficiency than present designs across water qualities ranging from drinking water (UVT10 mm 80-98) to high quality effluent from waste water treatment plants (UVT 70). UV systems incorporating the invention has been demonstrated to have 10-20% lower specific power consumption (SPC) compared to systems optimized for the point of comparison, and typically an SPC of less than half of the average performance of competing state of the art systems at point of comparison.

Figure 2:
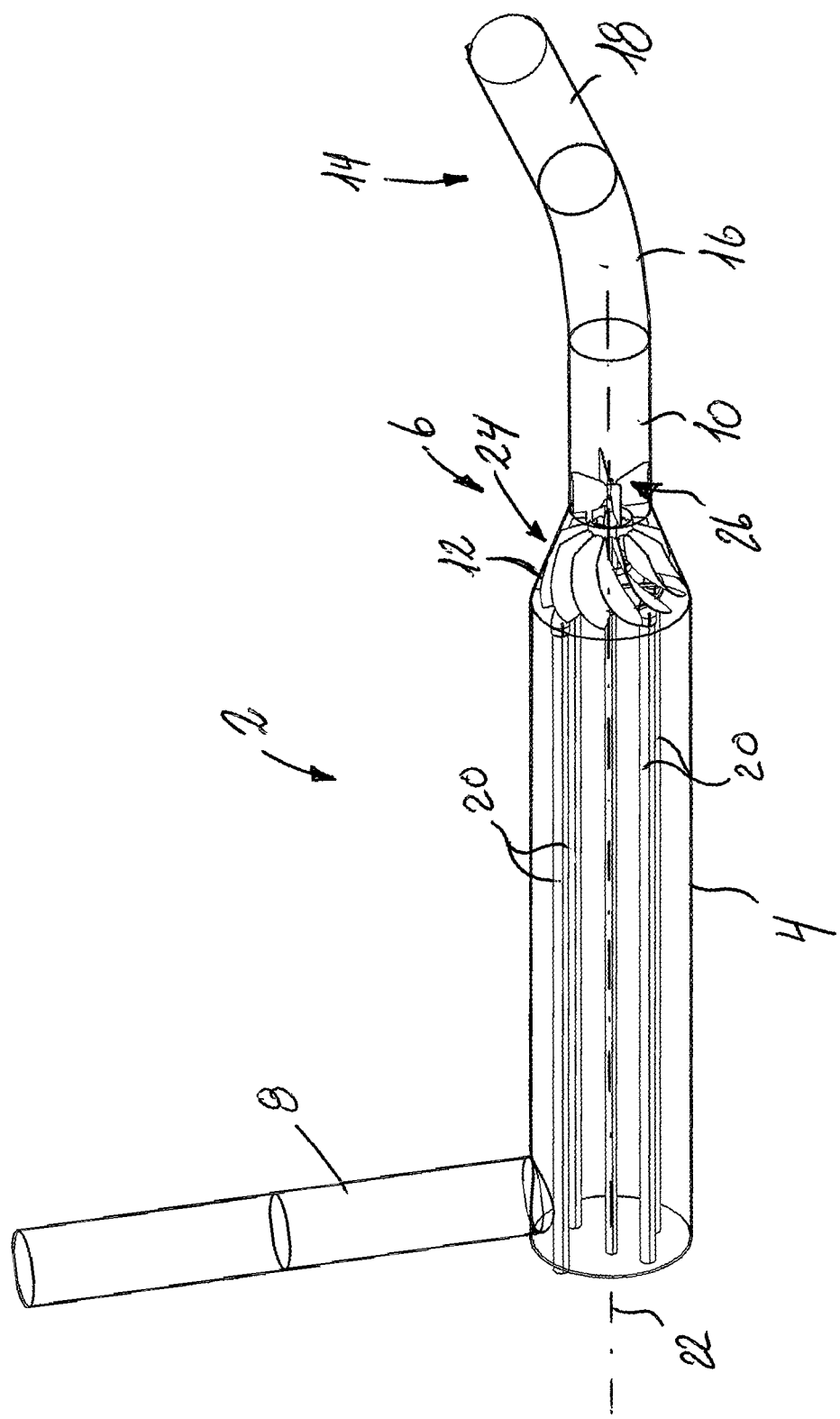
Figure 3:
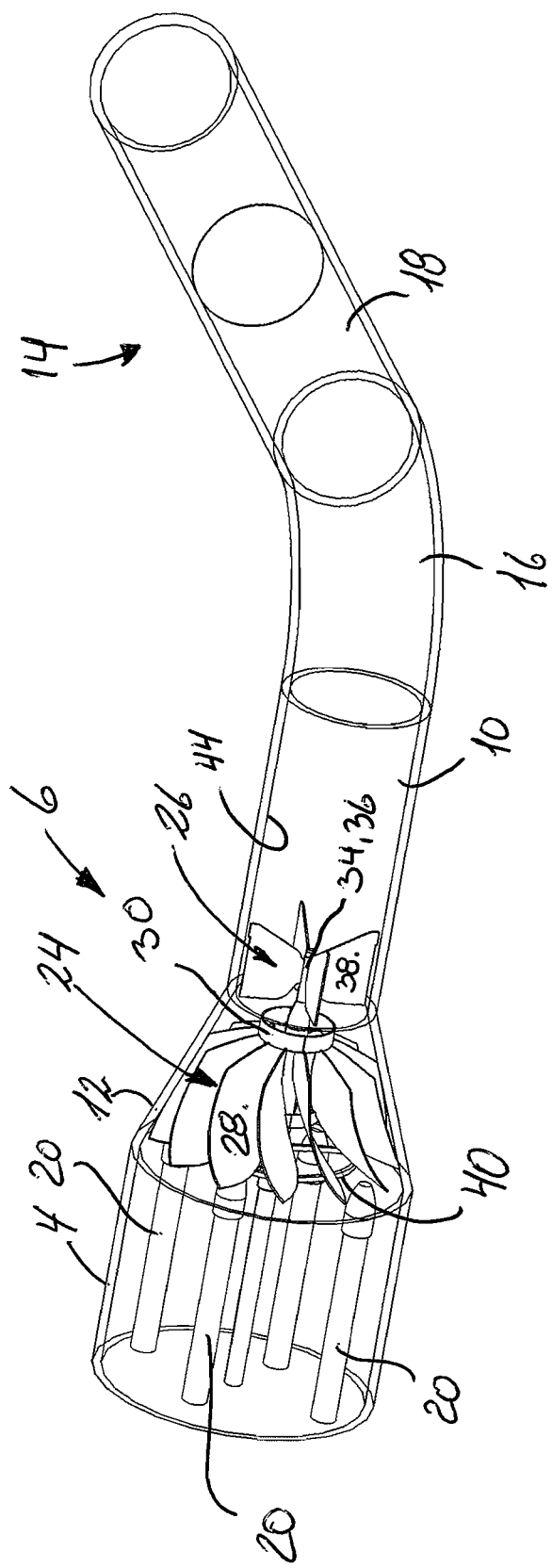
Figure 4:
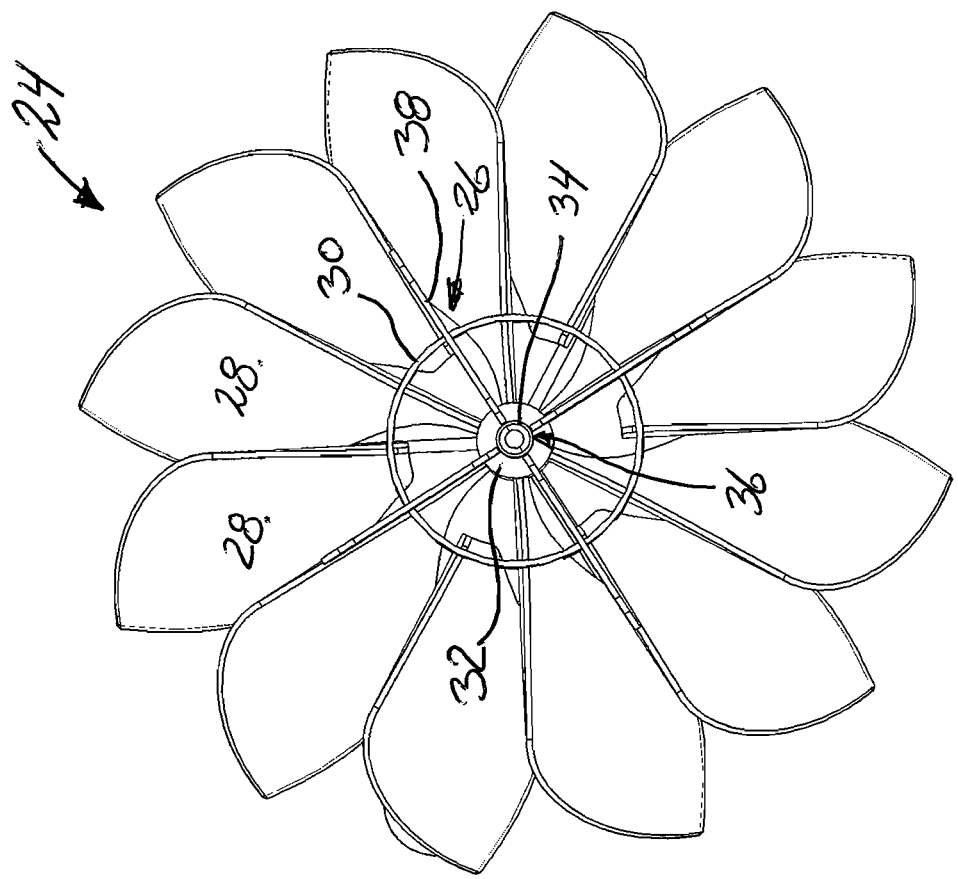
Figure 5:
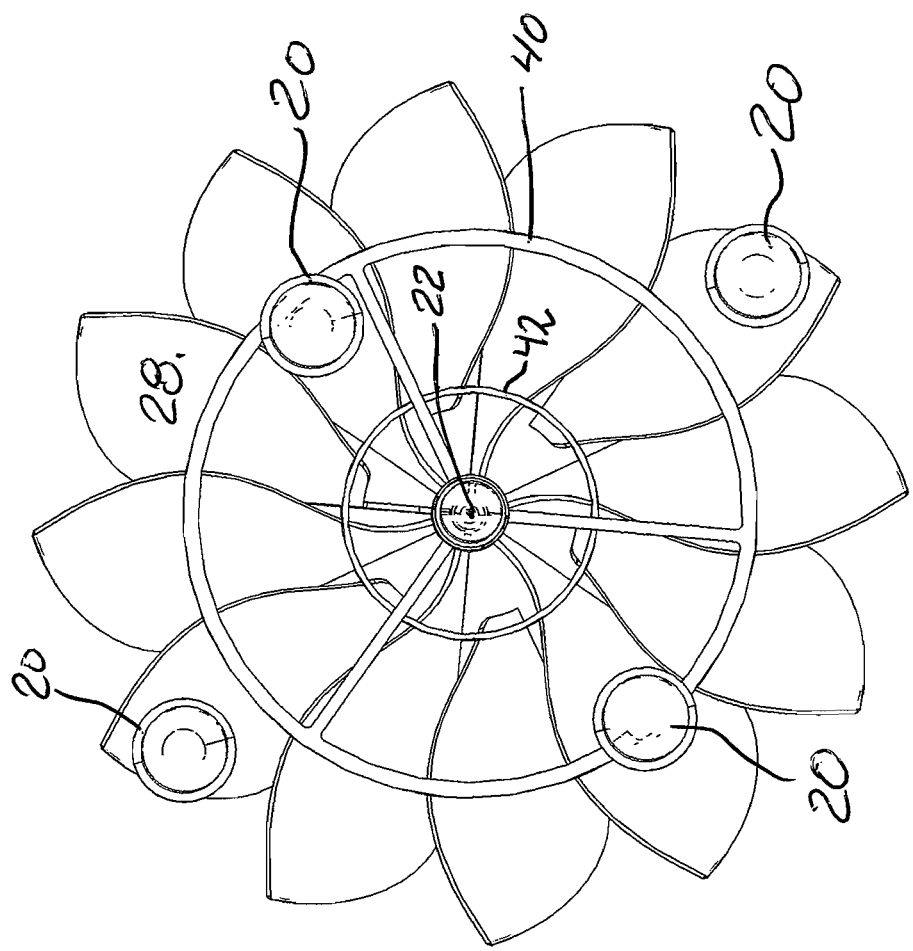
Figure 6:
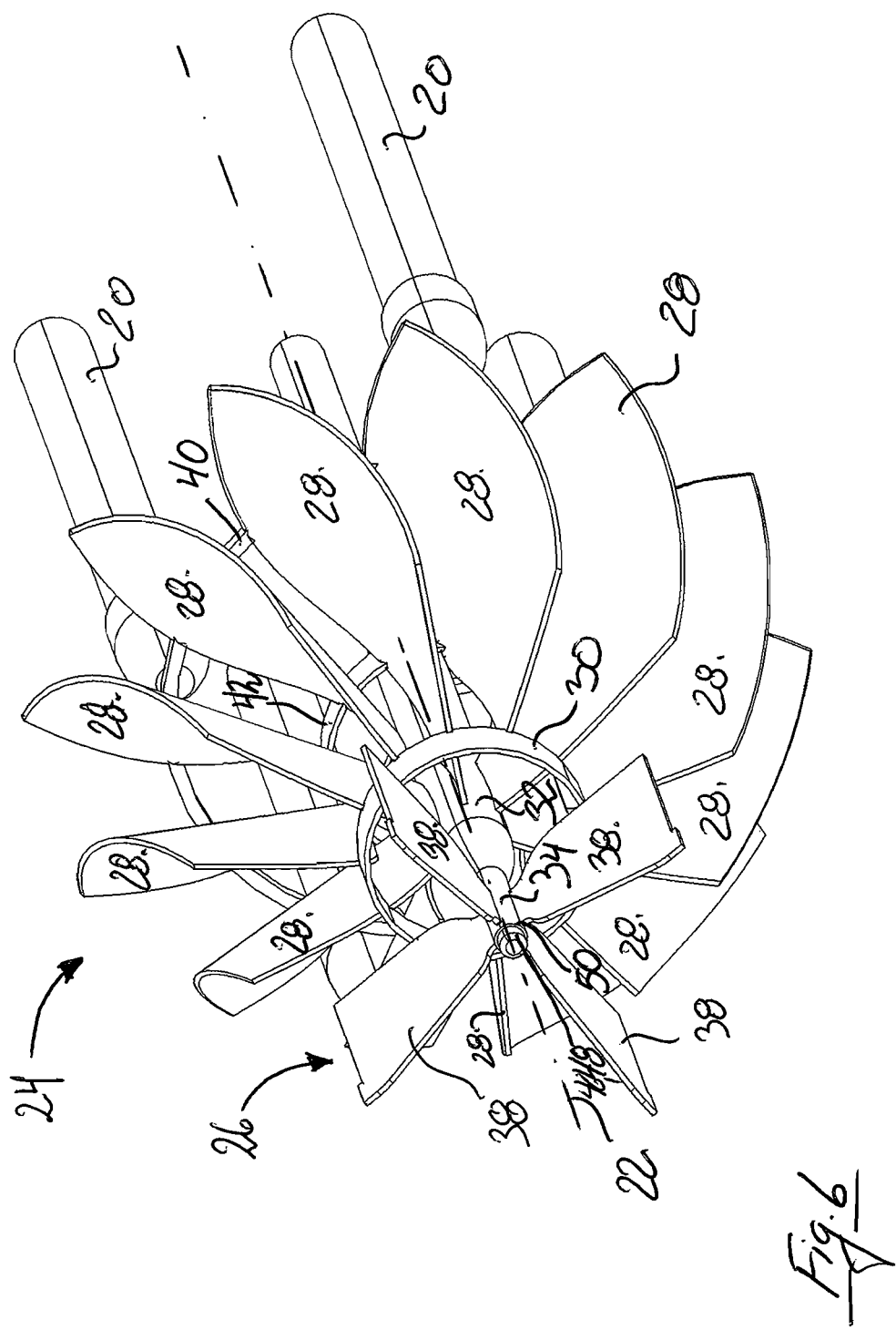
Figure 7:
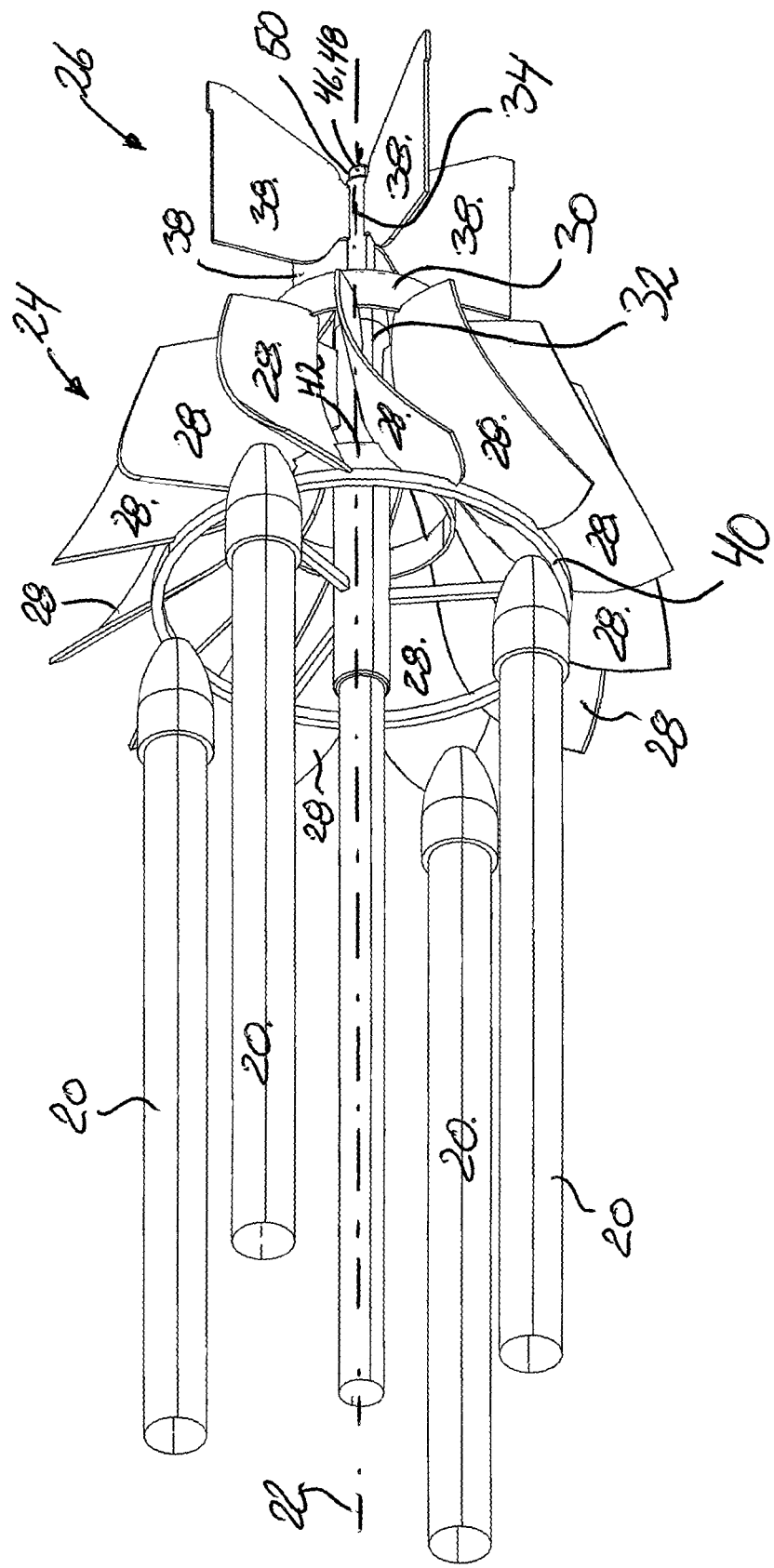
Figure 8:
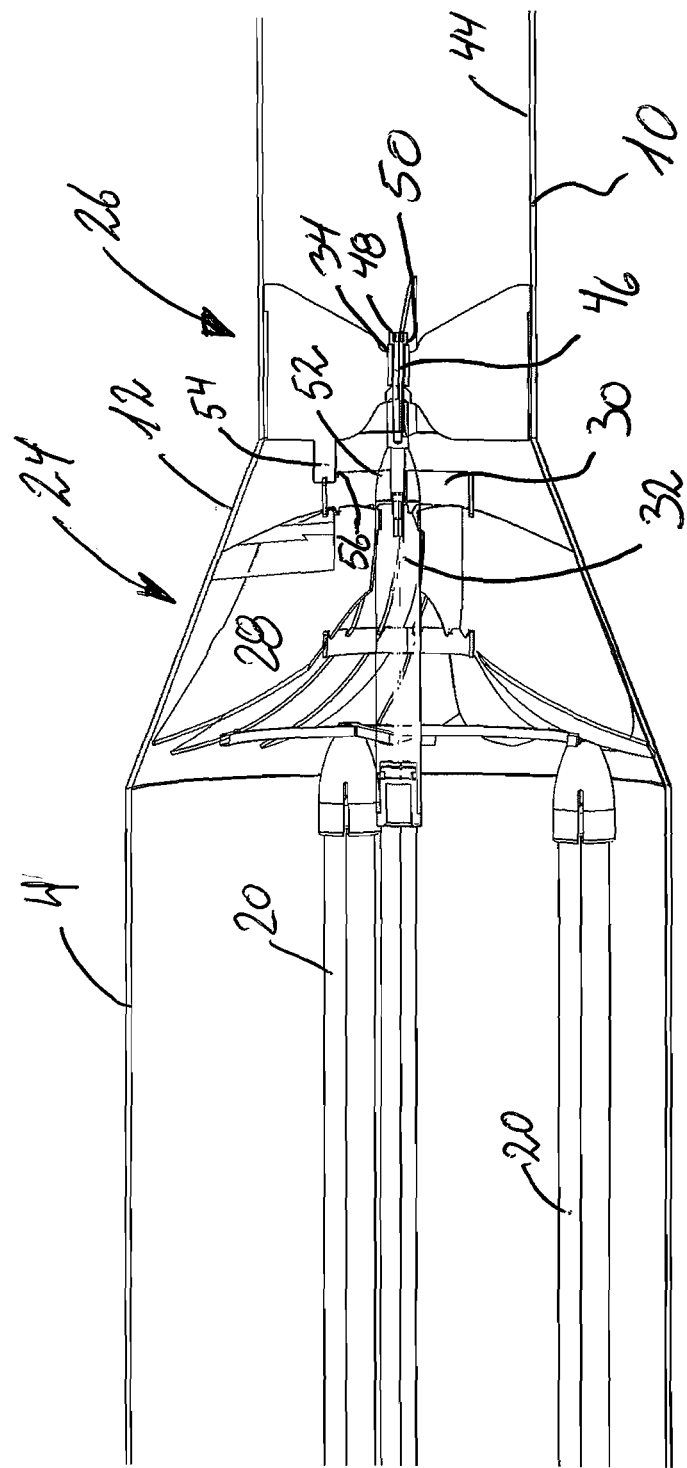
Figure 9:
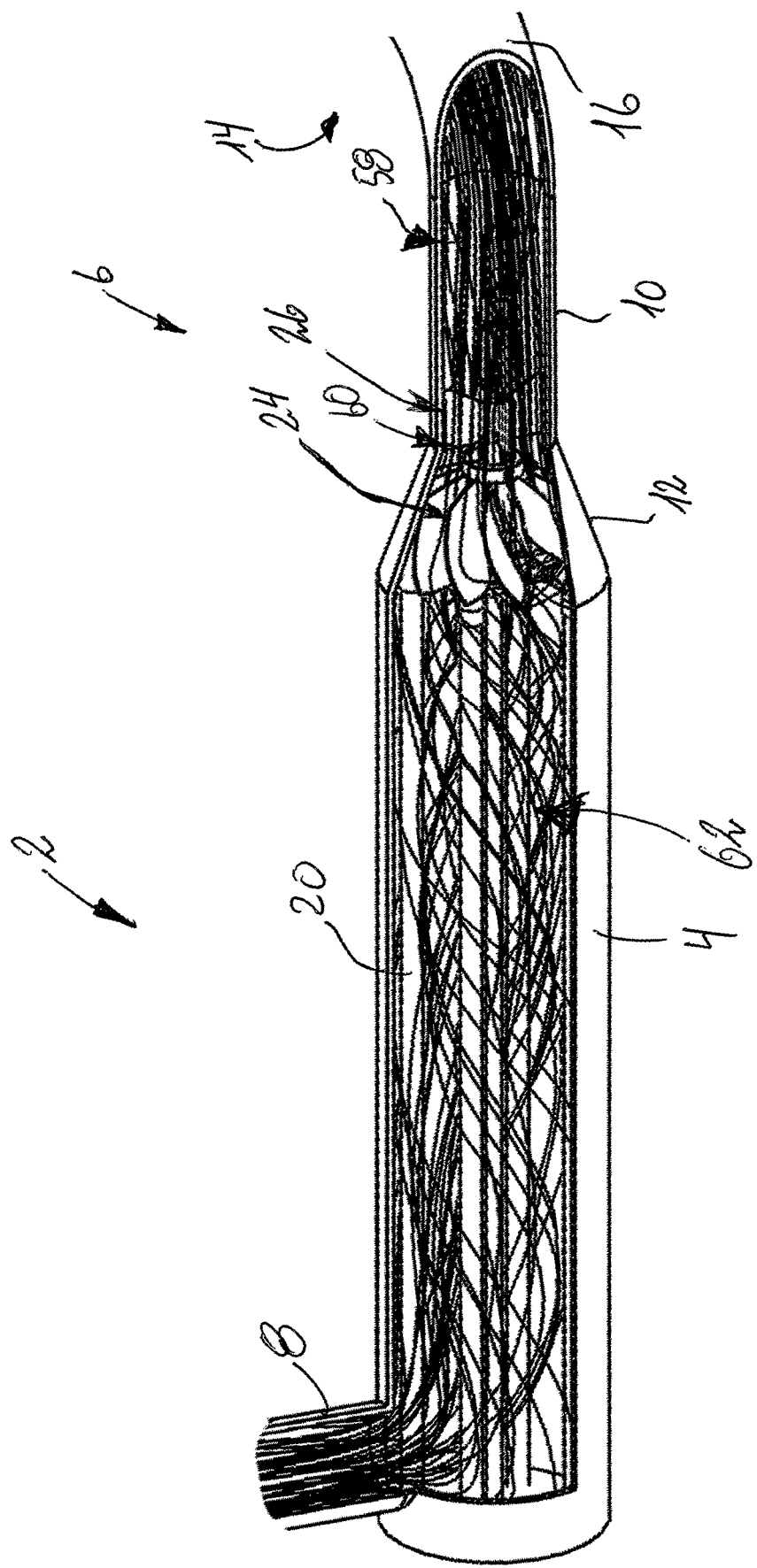
Figure 10:
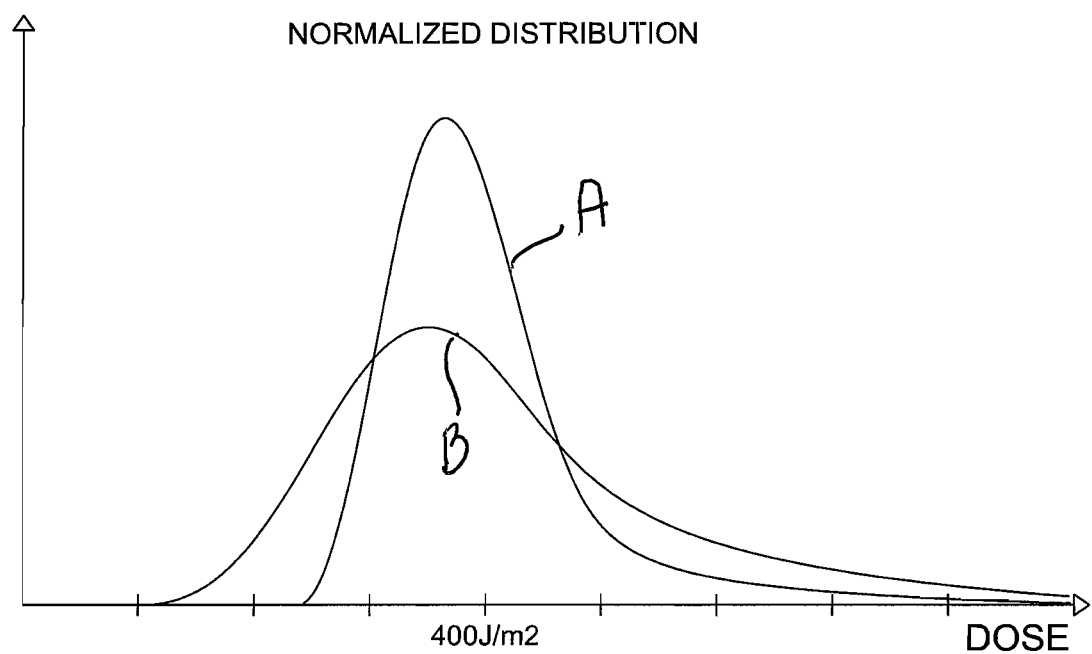

Exemplary embodiments of the present invention are described below with reference to the drawing, in which:

FIG. 1 is a perspective view of a UV reactor with piping according to the invention, FIG. 2 shows the same as in FIG. 1, where the piping and the shell of the UV reactor is transparent, FIG. 3 is a detail perspective view of the inlet of the UV reactor according to the invention, FIG. 4 is an end view of the UV reactor according to the invention shown from the inlet pipe side, FIG. 5 is an end view of the UV reactor according to the invention shown from the side of the flow chamber, FIG. 6 is a perspective view seen from the inlet pipe side, of the flow rectifier and the flow guide belonging to the UV reactor according to the invention, FIG. 7 is a perspective view seen from the flow chamber side, of the flow rectifier and the flow guide belonging to the UV reactor according to the invention, FIG. 8 is a section side view of the flow rectifier in the inlet pipe and the flow guide the cone between the inlet pipe and the reaction flow camber belonging to the UV reactor according to the invention, FIG. 9 is a perspective view of the UV reactor according to the invention showing the flow pattern of the fluid applied to the UV reactor, inside the inlet piping, the flow rectifier, the flow guide in the inlet cone, and in the flow chamber, and FIG. 10 shows distribution profiles of doses received by each volume element passing a reactor according to the present invention compared to a typical competing reactor.

FIG. 1 is a perspective view of an embodiment of an QV reactor 2 according to the invention comprising a longitudinal flow chamber 4, an input for entry of fluid into the flow chamber 4, an output 8 to exit the fluid from the flow chamber 4. The input 6 comprises an inlet pipe 10, connected with an inlet cone 12, which as a part of the flow chamber increases the cross section of the channel from the inlet pipe 10 to the cross section of the flow chamber 4. The inlet pipe 10 is connected to piping 14 for leading the fluid to the UV reactor, and the piping 14 shown comprises a bend 16 and a straight pipe 18, and may of course comprise further elements which is not shown here.

FIG. 2 and FIG. 3 shows the UV reactor 2 in FIG. 1, where the piping 14, the input 6, the flow chamber 4 and the output 8 has been made transparent.

The flow chamber 4 comprises a number of oblong UV-lamps 20 extending parallel to the center axis 22 of the UV reactor 2, but in different distances from the center axis, as it clear appears in FIG. 5. The center axis 22 of the UV reactor 2 is also center axis for the inlet cone 12 and the inlet pipe 10.

At the inside of the inlet cone 12 is located a flow guide 24, and in the inlet pipe 10 is located a flow rectifier 26.

FIG. 4 is an end view of the input 6, seen from side of the inlet pipe 10 and shows the flow guide 24 and the flow rectifier 26. The flow guide 24 comprises a number of radial protruding curved turbine blade shaped guide plates 28 (in the following pronounced turbine blades 28) equally distributed over the circular surface of the cone 12, cf. also FIG. 3. The turbine blades 28 are in the shown embodiment of the UV reactor according to the invention, attached to a first plate shaped ring 30 located closest to the inlet pipe 10 and some of the turbine blades 28 (every second) are further attached to a treaded bush 32 the center axis of which are coinciding with the center axis 22 of the UV reactor 2 and thus for the inlet cone and the inlet pipe 10.

The flow rectifier 26 consists of a first tube 34 the center axis coincides with the center axis of the inlet tube 10. In the shown embodiment of the UV reactor 2 according to the invention, the outer periphery 36 of the first tube 34 comprises 4 plate shaped bodies 38 extending to abutment with the inner wall of the inlet tube 10. Said plate shaped bodies 38 are equally mutually angled around the first tube 34, and having a mutual angle on 90° Cf. FIG. 3 and more clear FIG. 6.

FIG. 5 is an end view of the UV reactor 2 according to the invention shown from the side of the flow chamber 4, wherein the wall of the flow chamber is hidden. As it clearly appears, the UV oblong UV-lamps 20 are arranged in different distances from the center axis 22 of the longitudinal flow chamber 4. Further is shown a second support ring 40, located at the end of the inlet cone 12, closest to the flow chamber 4, said support ring supporting the turbine blades 28. The second support ring 40 also appears in FIG. 3 and more clearly in FIG. 6 and FIG. 7.

FIG. 6 is a perspective view seen from the side of the inlet pipe 10, and FIG. 7 is a perspective view seen from the flow chamber side, of the flow rectifier 26 and the flow guide 24 belonging to the UV reactor 2 according to the invention.

As it appears from FIG. 7 and FIG. 8, the flow guide 24 comprises a third support ring 42, located between the first plate shaped ring 30, and the second support ring 40. The third support ring 42 serves to increase the stability of the turbine blades 28 of the flow guide 24.

As it also appears from FIG. 7 and FIG. 8, the flow rectifier 26 comprises a first tube 34 located in the longitudinal axis 22 of the inner periphery of the inlet pipe 10 cg. FIG. 2, from the outer periphery 36 of said first tube 34, one or more plate shaped bodies 38 extends to the inner wall 44 of the inlet pipe 10 (c.f. FIG. 3), said plate shaped bodies 38 being equally mutually angled around the first tube 34, and being attached to the inner wall 44 of the inlet pipe 10.

As it further appears from FIG. 7 and FIG. 8 the first plate shaped ring 30 of the flow guide 24 is via some of the turbine blades 28 connected to the treaded bush 32 cooperating with a treaded bolt 46 lead through the first tube 34, said bolt 46 having a head 48 which is in abutment with the reverse end 50 of the said first tube 34. Thus, the flow guide 24 and the flow rectifier are mutually connected to each other.

FIG. 8 which is a side section view of the flow rectifier 26, in the inlet pipe 10, and the flow guide 24 in the inlet cone 12, between the inlet pipe 10 and the flow camber 4 belonging to the UV reactor according to the invention, discloses an embodiment of the connection between the flow guide 24 and the flow rectifier 26. As it appears, the treaded bush 32 is provided with a cap 52 at the end closest to the flow rectifier 26.

FIG. 8 also discloses that one of the plate shaped bodies 38 of the flow rectifier 26 comprises a protrusion 54 at the against the first plate shaped ring 30 adjacent side, extending in direction of the first plate shaped ring 30. Said protrusion is cooperating with a track 56 in the first plate shaped ring 30, for positioning of the flow guide 24 relative to the flow rectifier 26.

FIG. 9 is a perspective view of the UV reactor 2 according to the invention showing a computer calculated flow pattern 58 of the fluid applied to the UV reactor according to the invention, inside the inlet piping 16, 10, the flow rectifier 26, the flow guide 24 in the inlet cone 12, and in the flow chamber 4.

As it appears, the flow pattern in the fluid having passed the bend 16 is turbulent, however, the turbulence in the fluid is dampened having passed the flow rectifier 26, and having passed the flow guide 24 in the inlet cone 12, the flow pattern in the fluid has become uniform and helical. This will enable a more uniform UV-radiation of the bacteria and microorganisms or other particles in the fluid, and enable for a lower consumption of energy per treated m$^3$ fluid.

FIG. 10 shows distribution profiles of doses received by each volume element passing a reactor according to the present invention (curve A) compared to a competing reactor (curve B). Both systems have the same average doses of 400 J/m2. Due to the invention, the distribution of the new system has a more narrow profile and results in more volume elements receiving close to 400 J/m2 compared to a competing system, where turbulence or lack of exposure of some volume elements due to direct passage through a lower intensity area of the chamber causes a wider distribution in the received doses. FIG. 10 shows the same dose curves adjusted according to the response curves of a biodosemeter (*Bacillus subtilis*).

The exponential relationship between dose and actual bacteria reduction results in the effect that doses delivered to volume elements of the traditional systems is further below average compared to those of the present invention has a negative impact on the combined REF and thereby the system performance.

It should be noticed, that the inventor has realized, that the UV reactor according to the invention may take other designs and embodiments than the embodiment disclosed in the drawings and as specified above, for example could the flow rectifier consist of one or more plate shaped bodies, oriented transverse to the longitudinal center axis of the UV reactor and the inlet pipe, said plates having one or more take outs for passing fluid into the UV reactor. The attachments of the flow guide in the inlet cone and the connection between the flow guide and the flow rectifier could also take other designs.

LIST OF POSITION NUMBERS

2 UV reactor
4 longitudinal flow chamber
6 input
8 output
10 inlet pipe
12 inlet cone
14 piping
16 bend (pipe)
18 straight pipe
20 oblong UV-lamps
22 longitudinal center axis of the UV reactor
24 flow guide
26 flow rectifier
28 radial protruding curved turbine shaped guide plates (turbine plates)
30 first plate shaped ring
32 treaded bush
34 first tube
36 outer periphery of 34
38 plate shaped bodies (of 26)
40 second support ring for 24
42 third support ring for 24
44 inner wall of 10
46 treaded bolt
48 head of 46
50 reverse end of 34
52 cap on 46
54 protrusion on 38
56 take out in 30
58 flow pattern for the applied fluid in the inlet pipe 10
60 flow pattern for the applied fluid after the flow rectifier 26
62 flow pattern for the applied fluid after the flow guide 24

A distribution profile of dose received by each volume element passing the UV reactor according to invention B distribution profile of dose received by each volume element passing a competing UV reactor

The invention claimed is:

1. A UV reactor for treating fluids, comprising a longitudinal flow chamber having a longitudinal center axis, an input for entry of fluid in the flow chamber, and an output for fluid to exit the flow chamber, where at least the input of the flow chamber comprises an inlet pipe followed by an inlet cone which as a part of the flow chamber increases the cross section of the channel from the inlet pipe to a cross section of the flow chamber of the UV reactor, said UV reactor having at least one longitudinal UV-lamp parallel to, but not coinciding with the longitudinal center axis, and where the UV-lamp is arranged such that fluid can flow along a flow path from the input to the output via the flow chamber, and so that fluid flowing along the flow path can be exposed to UV-radiation as the fluid flows from the input to the output, wherein the inlet cone has a flow guide comprising a number of radial protruding equally curved turbine blade shaped guide plates on the reverse side relative to the inlet pipe, said curving turbine blade shaped guide plates being equally distributed over the circular surface of the cone, said guide plates extending between the inlet of the cone and the cone end, wherein the inlet pipe comprises a flow rectifier comprising of at least one plate shaped body located in the inlet pipe.

2. The UV reactor according to claim 1, wherein the curving turbine blade shaped guide plates is attached to an inner wall of the cone.

3. The UV reactor according to claim 1, wherein the flow guide comprises a first plate shaped ring with a number of radial protruding equally curved turbine blade shaped guide plates on the reverse side relative to the inlet pipe, where a plurality of said curving turbine blade shaped guide plates being equally distributed over the circular surface of the first plate shaped ring and the cone, said guide plates extending between the first plate shaped ring at the inlet of the cone and the cone end.

4. The UV reactor according to claim 3, wherein the flow guide is releasably fixed in position in the cone.

5. The UV reactor according to claim 3, wherein the flow guide at the end of the inlet cone closest to the flow chamber comprises a second support ring supporting the radial protruding equally curved, turbine blade shaped guide plates.

6. The UV reactor according to claim 3, wherein the flow guide further comprises a third support ring located between the first plate shaped ring and the second support ring closest to the flow chamber, supporting the radial protruding equally curved turbine blade shaped guide plates.

7. The UV reactor according to claim 1, wherein the flow rectifier comprises a first tube located in the longitudinal center axis of the inner periphery of the inlet tube, and from the outer periphery of which first tube, one or more plate shaped bodies extends to the inner wall of the inlet tube, said plate shaped bodies being equally mutually angled around the first tube, and being attached to the inner wall of the inlet tube.

8. The UV reactor according to claim 1, wherein the inlet cone has a flow guide comprising a first plate shaped ring with a number of radial protruding equally curved turbine blade shaped guide plates on the reverse side relative to the inlet pipe, where a plurality of said curving turbine blade shaped guide plates being equally distributed over the circular surface of the first plate shaped ring and the cone, said guide plates extending between the first plate shaped ring at the inlet of the cone and the cone end, and wherein the first plate shaped ring is releasably attached to the flow rectifier.

9. The UV reactor according to claim 7, wherein at least one of the plate shaped bodies of the flow rectifier comprises a protrusion at the first plate shaped ring adjacent side, extending in direction of the first plate shaped ring, said protrusion cooperating with a take out in the first plate shaped ring, for positioning of the flow guide relative to the flow rectifier.

10. The UV reactor according to claim 3, wherein the inlet pipe comprises a flow rectifier comprising of at least one plate shaped body located in the inlet pipe, and wherein the flow rectifier comprises a first tube located in the longitudinal center axis of the inner periphery of the inlet tube, and from the outer periphery of which first tube, one or more plate shaped bodies extends to the inner wall of the inlet tube, said plate shaped bodies being equally mutually angled around the first tube, and being attached to the inner wall of the inlet tube, and wherein the first plate shaped ring of the flow guide via some of the curved turbine blade shaped guide plates are connected to a treaded bush cooperating with a treaded bolt lead through the first tube, said treaded bolt having a head which is in abutment with the reverse end of the said first tube.

11. The UV reactor according to claim 1, wherein the UV reactor comprises a plurality of UV-lamps.

12. The UV-reactor according to claim 8, wherein the UV-lamps are arranged at different distances from the longitudinal center axis of the flow chamber.

13. The UV reactor of claim 1 wherein the flow guide is stationary within the inlet cone.

* * * * *

UNITED STATES PATENT AND TRADEMARK OFFICE
CERTIFICATE OF CORRECTION

| | |
|---|---|
| PATENT NO. | : 11,529,604 B2 |
| APPLICATION NO. | : 17/049923 |
| DATED | : December 20, 2022 |
| INVENTOR(S) | : Jens Skjølstrup and Mathias Kraemmergaard Kristensen |

It is certified that error appears in the above-identified patent and that said Letters Patent is hereby corrected as shown below:

In the Claims

In Claim 12, delete "claim 8," and insert --claim 11,--.

Signed and Sealed this
Twenty-fourth Day of January, 2023

Katherine Kelly Vidal
*Director of the United States Patent and Trademark Office*